INVENTOR.
WILLIAM W. PHARIS
BY T. L. Bowes
ATTORNEY

INVENTOR.
WILLIAM W. PHARIS
BY T. L. Bowes
ATTORNEY

Feb. 15, 1955 W. W. PHARIS 2,702,314

CONVERSATION TIMING MEANS

Filed July 19, 1952 7 Sheets-Sheet 3

INVENTOR.
WILLIAM W. PHARIS

BY T. L. Bowes

ATTORNEY

Feb. 15, 1955 W. W. PHARIS 2,702,314
CONVERSATION TIMING MEANS
Filed July 19, 1952 7 Sheets-Sheet 4

INVENTOR.
WILLIAM W. PHARIS
BY T. L. Bowes
ATTORNEY

Feb. 15, 1955 W. W. PHARIS 2,702,314

CONVERSATION TIMING MEANS

Filed July 19, 1952 7 Sheets-Sheet 5

INVENTOR.
WILLIAM W. PHARIS
BY T. L. Bowes
ATTORNEY

Feb. 15, 1955 W. W. PHARIS 2,702,314

CONVERSATION TIMING MEANS

Filed July 19, 1952 7 Sheets-Sheet 6

INVENTOR.
WILLIAM W. PHARIS
BY T. L. Bowes
ATTORNEY

Feb. 15, 1955 W. W. PHARIS 2,702,314

CONVERSATION TIMING MEANS

Filed July 19, 1952 7 Sheets-Sheet 7

INVENTOR.
WILLIAM W. PHARIS

BY T. L. Bowes

ATTORNEY

United States Patent Office 2,702,314

Patented Feb. 15, 1955

2,702,314

CONVERSATION TIMING MEANS

William W. Pharis, Rochester, N. Y., assignor to Stromberg-Carlson Company, a corporation of New York Application July 19, 1952, Serial No. 299,800

18 Claims. (Cl. 179—7.1)

This invention relates to automatic telephone systems and more particularly to conversation timing means for use in automatic telephone circuits.

It is an object of my invention to provide a new and improved conversation timing means.

It is another objective of my invention to provide a new and improved conversation timing means for use in automatic telephone systems which provides for conversation timing only on specified levels of an associated switch.

Still another objective of my invention is to provide conversation timing means together with means for canceling the conversation timing feature on toll calls and also on certain local calls.

Figure 1:
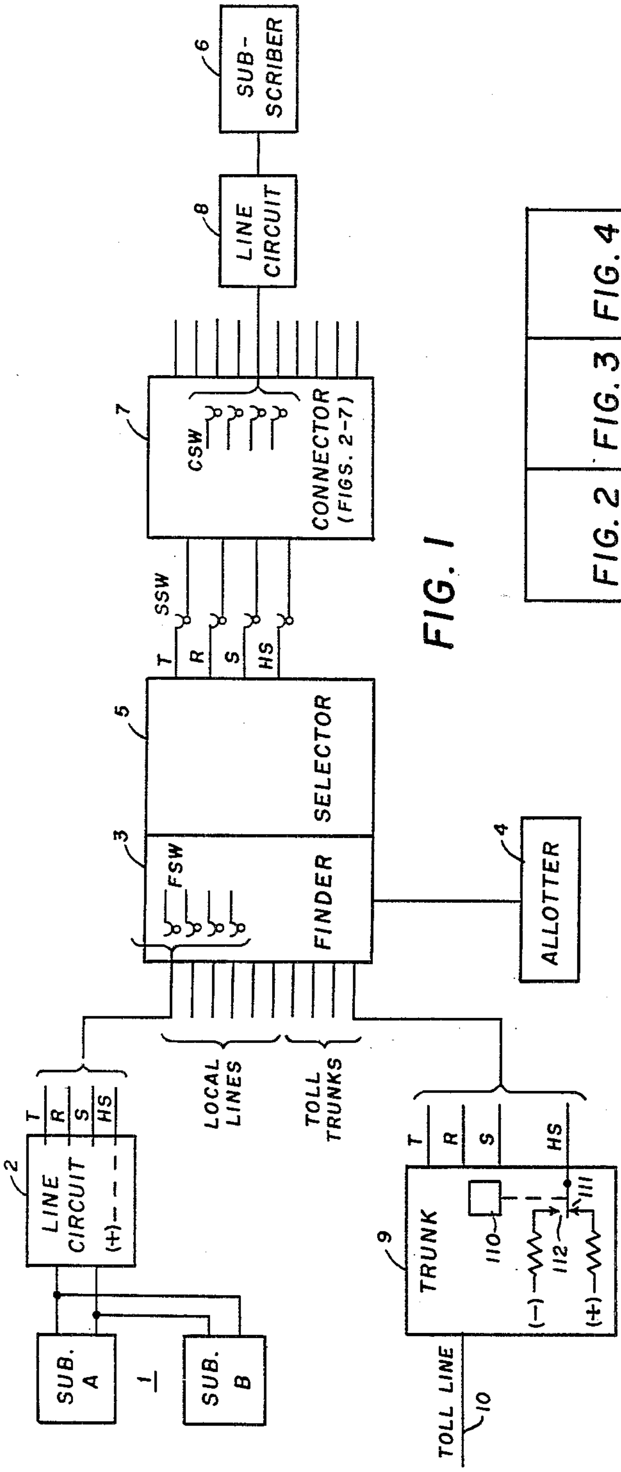
Figure 9:
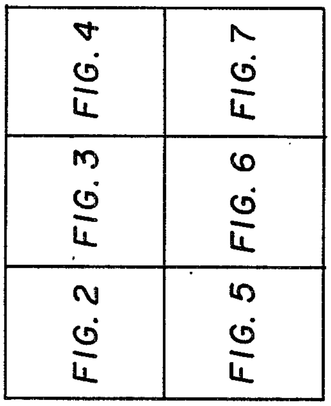
Figure 8:
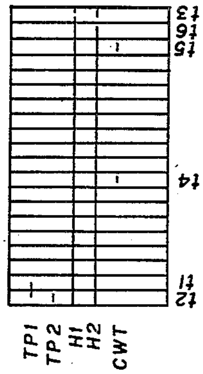

The features of my invention which I believe to be novel are set forth with particularity in the appended claims. My invention itself, both as to its organization and manner of operation, together with further objectives and advantages thereof, may best be understood by referring to the following description taken in connection with the accompanying drawing in which:

Fig. 1 is a diagram illustrating the principal components of an automatic telephone system and employing the principles of my invention;

Figs. 2 to 7 inclusive, comprise a schematic diagram of a connector embodying the principles of my invention when assembled as shown in Fig. 9; and Fig. 8 is a chart useful in understanding the operation of the circuit shown in Figs. 2 to 7 inclusive.

Referring ot Fig. 1, there is shown a telephone system comprising a calling line 1 which may be a private line or a party line as desired, a party line having subscriber's substations A and B being illustrated. Line 1 terminates in a suitable line circuit 2. Means is provided for finding a calling line and may comprise a suitable linefinder 3 which may be allotted for the linefinding operation by a suitable allotter 4. The linefinder may include a suitable step-by-step switch FS*w*.

In the illustrated form of my invention, linefinder 3 is part of a finder-selector link, the selector portion being indicated by the numeral 5. In order to extend a call from selector 5 to a called line, such as indicated by numeral 6, there my be provided a plurality of connectors, one of which is indicated by the numeral 7. It will be understood by those skilled in the art that selector 5 will be operated to select an idle connector through the agency of a suitable switch, preferably of the step-by-step type, indicated by the symbol SS*w*. A call cut through to a connector 7 may be further extended to subscriber 6 by means of a suitable step-by-step switch CS*w* and a suitable line circuit 8.

The above described major components of a system may be conventional and suitable circuits for the above described components are illustrated and described in Morris Patent 2,567,650 granted September 11, 1951.

In the arrangement shown in Fig. 1 there is also illustrated means by which finder 3 may have access to incoming toll trunks. There is illustrated a toll trunk terminating in a suitable trunk circuit 9 which in turn provides a termination for an incoming toll line 10.

I. LOCAL CALL

A. *Seizure*

For a detailed description of the operation of the connector 7, reference may be had to Figs. 2 to 7, inclusive. Assuming that selector switch SS*w* has selected the connector illustrated in Figs. 2 to 7, a connection will have been extended from the calling subscriber on line 1 by way of incoming tip lead T (Fig. 5) and ring lead R to calling bridge relay 520 through normal contacts 511 and 512 respectively. Inasmuch as the calling subscriber's receiver is assumed to be in an off-hook condition, a circuit is completed for energizing relay 520 through both windings thereof to suitable potential. In response to the operation of calling bridge relay 520, a circuit is completed for lighting lamp MON (Fig. 4) from the grounded positive terminal of a source of direct current, indicated by the symbol (+) by way of operated contacts 221 and normal contacts 341 to one terminal of the lamp, the other terminal being connected to battery, i. e., the negative terminal of the potential source, as indicated by the symbol (—). A delay relay 530 is also energized upon the operation of relay 520 over a circuit extending from the winding of relay 530 through operated contacts 222, closed off-normal contacts Z–1 of the release magnet Z to (+).

In response to the operation of the relay 530, ground is extended to switching relay 720 from operated contacts 531 through normal contacts 711 to the lower winding of relay 720; the back sleeve lead S is grounded at operated contacts 532; a circuit is completed to energize X-delay relay 540 from the lower winding of relay 540 by way of normal contacts 351, Y off-normal contacts Y–1, X off-normal contacts X–1, and operated contacts 231 to ground, the closure of contacts 231 providing a source of master ground; a circuit is completed for operating Y-delay relay 610 over a circuit extending through the upper winding of relay 610, and Y off-normal contacts Y–2 to master ground; a circuit is closed for energizing the upper winding of relay 620 by way of normal contacts 411, off-normal contacts MZ–1 of minor switch M (Fig. 4), and normal contacts 513 to master ground; and one point in the switch impulsing path is closed at contacts 232 of delay relay 530.

The operation of X-delay relay 540 closes an additional point in the impulsing path at operated contacts 242.

The operation of Y-delay relay 610 closes an alternate path for lamp MON through operated contacts 311 and 221; completes an alternate path for energizing relay 620 by way of operated contacts 312, off-normal contacts MZ–1 and normal contacts 513 to master ground; prepares a circuit for ring trip relay 650 at operated contacts 611; and provides an alternate ground for the back sleeve lead at operated contacts 612.

The operation of relay 620 completes the impulsing path at contacts 321, and circuits for X-delay relay 540 and stepping magnet X in parallel.

The circuit of Figs. 2 to 7 is now ready to receive dial pulses.

B. *First digit*

When the calling subscriber dials the first digit, the calling loop is opened in the conventional manner and calling bridge relay 520 restores upon each opening of the calling loop to effect the deenergization of slow-to-release delay relay 530 which, however, remains operated during each digit because of its slow-to-release characteristics. As soon as calling bridge relay 520 releases, normal contacts 223 close to complete a circuit for energizing the upper winding of X-delay relay 540 and stepping magnet X of the connector switch CS*w* in parallel. The circuit for stepping magnet X extends from battery on one side of magnet X, through the magnet to ground by way of operated contacts 242, 321 and 232, normal contacts 223 and Z–1.

Upon the first operation of stepping magnet X, connector switch CS*w* moves one step in the primary or X direction. Upon the movement of the switch in the X direction, the X off-normal switch XON operates to ground the start lead ST by way of operated off-normal contacts X–2 and normal contacts 352 in order to start the tone generators, etc.; and to open the energizing circuit to the lower winding of relay 540 at now open contacts X–1.

At the end of the first impulse of the first digit, relay 520 reoperates and closes the energizing circuit for the delay relay 530 at contacts 222. At this point it may be noted that relays 530 and 540 are both slow-to-release and hence hold up during the relatively brief periods between impulses of the first digit. From the foregoing description it will be understood that switch CS*w* moves one step in the primary or X direction for each impulse of the first digit in order to select a desired level of contacts. At the end of the first digit, calling bridge relay 520 remains operated and opens the energization circuits for the upper winding of delay relay 540 and the X magnet. After a predetermined interval of time the X-delay relay 540 releases.

The restoration of relay 540 transfers the above described impulsing circuit from magnet X to magnet Y and the Y-delay relay 610 in parallel. The circuit for energizing relay magnet Y extends from the magnet through operated contacts 313 of Y-delay relay 610, normal contacts 243 of XD delay relay 540, operated contacts 321 and 232, normal contacts 223 and normal contacts Z–1.

C. *Second digit*

When the calling subscriber dials the second digit of the called subscriber's number, the calling bridge relay 520 again releases a number of times corresponding to the dialed number and thereby periodically closes a circuit to both the Y-delay relay 610 and the secondary or Y direction magnet Y. The switch moves one step in the Y direction on each impulse of the second digit in order to select a desired contact in the level. As soon as the connector switch takes its first step in the Y direction, the Y off-normal springs YON are operated. At the end of the first impulse of the second digit the calling loop is again reclosed to the calling bridge relay 520 to re-operate that relay and reenergize delay relay 530. Relays 610 and 530 remain operated during impulsing due to their slow-to-release characteristics. The remainder of the series of dial pulses moves the switch CS*w* in the secondary direction to a position corresponding to the desired line. At the end of the second digit, relay 520 remains operated and opens the circuit to relay 610 and magnet Y at now open contacts 223, whereupon relay 610 releases after a predetermined delay.

In response to the restoration or release of relay 610, a circuit is prepared through the lower winding of party delay relay 620 and the magnet MX of minor switch M in parallel through normal contacts 314 and 243, operated contacts 321 and 232, normal contacts 223 and normal contacts Z–1 to ground. The restoration of relay 610 also connects the upper winding of busy test relay 710 to the forward sleeve lead S over a circuit extending from the connector switch sleeve brush S through normal contacts 613 and 641, operated contacts 621 and normal contacts 721.

D. *Third digit*

When the calling subscriber dials the third or ringing signal selecting digit, the above prepared circuit for relay 620 and stepping magnet MX is completed at pulsing contacts 223 upon the release of relay 520 during the impulses of the third digit. Magnet MX causes minor switch M to move forward one step on each impulse. The movement of minor switch M causes the off-normal springs of the minor switch to open, thereby opening the energizing circuit for the upper winding of relay 620 at contacts MZ–1. Inasmuch as both relays 620 and 530 are slow-to-release, these relays remain operated, even though deenergized periodically, during impulsing. However, minor switch M operates to move one step at a time to the desired terminal and after the last impulse of the third digit, relay 520 reoperates to open the energizing circuits to magnet MX and the lower winding of relay 620 at contacts 223 and to reenergize relay 530 at contacts 222.

E. *Busy test*

If the called line is busy, ground is encountered by the connector sleeve brush S in the conventional manner thereby effecting the operation of the busy test relay 710 during the release time of party delay relay 620 over the previously prepared circuit extending from ground on the S brush through normal contacts 613 and 641 and still-operated contacts 621 and normal contacts 721 to the upper winding of busy test relay 710.

The operation of busy test 710 opens the previously prepared circuit to the lower winding of switching relay 720 at normal contacts 711; connects lamp MON to ground through operated contacts 412; prepares a circuit for operating ring trip relay 650 at operated contacts 413; connects impulsing lead 601PM (Fig. 7) to toll relay 640 through operated contacts 712, normal contacts 722 and 622, and the upper winding of toll relay 640 to battery; and opens another point in the holding circuit for relay 620 at contacts 411.

Upon the restoration of relay 620 after a predetermined delay, there is completed a holding circuit for busy test relay 710 through the upper winding of the busy test relay, normal contacts 721 and 623, and operated contacts 713 to ground at operated contacts 531. The restoration of relay 620 also prepares a circuit for ring trip relay 650 to master ground by way of normal contacts 322 and 421, and operated contacts 413 to the upper winding of relay 650.

The ring trip relay 650 operates to connect busy tone lead BT (Fig. 4) to tip lead T by way of normal contacts 422, upper winding of answering bridge relay 510, operated contacts 651 and 714, talking condenser C–51 and normal contacts 511. The ring trip relay 650 locks to master ground through normal contacts 513, off-normal contact MZ–2 of minor switch M, operated contacts 652 and the upper winding of 650 to battery.

Means is provided for switching through if the called line is found idle. In this situation the conventional resistance battery (not shown) is encountered by the sleeve brush S instead of busy ground and, therefore, switching relay 720 operates from resistance battery on the front sleeve, the circuit extending from sleeve brush S through normal contacts 613, 641 and 624, lower winding of relay 720, normal contacts 711 and operated contacts 531 to ground.

Figure 4:
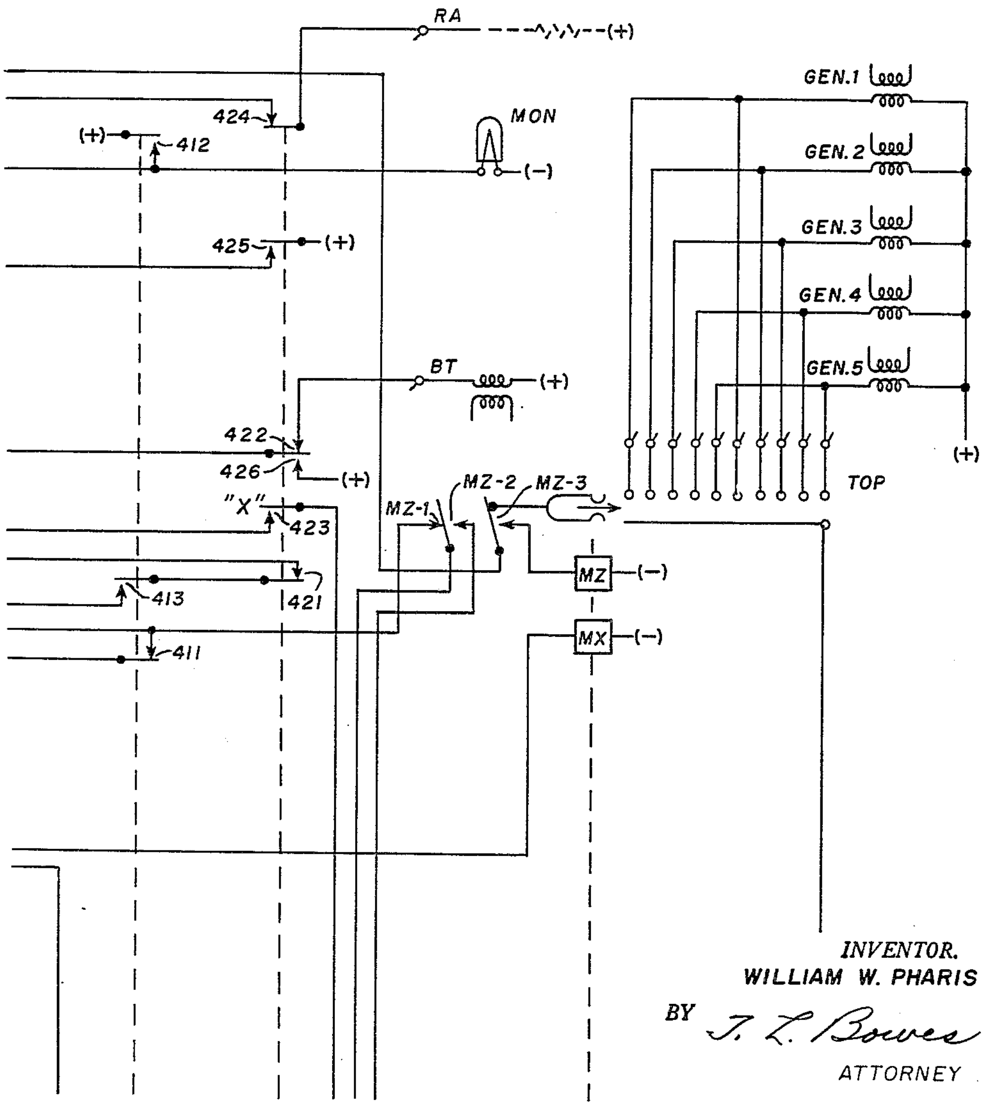
Figure 5:
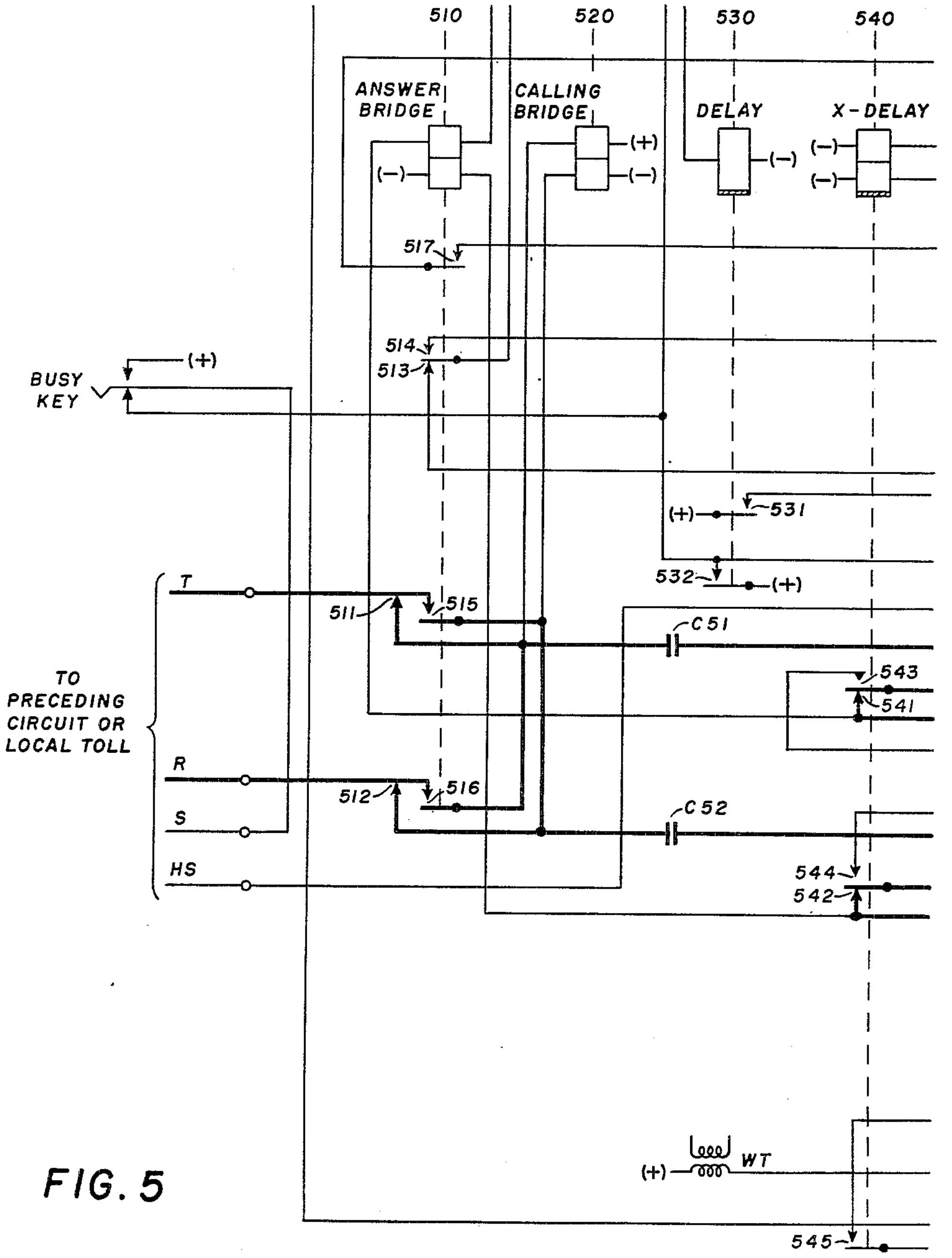
Figure 6:
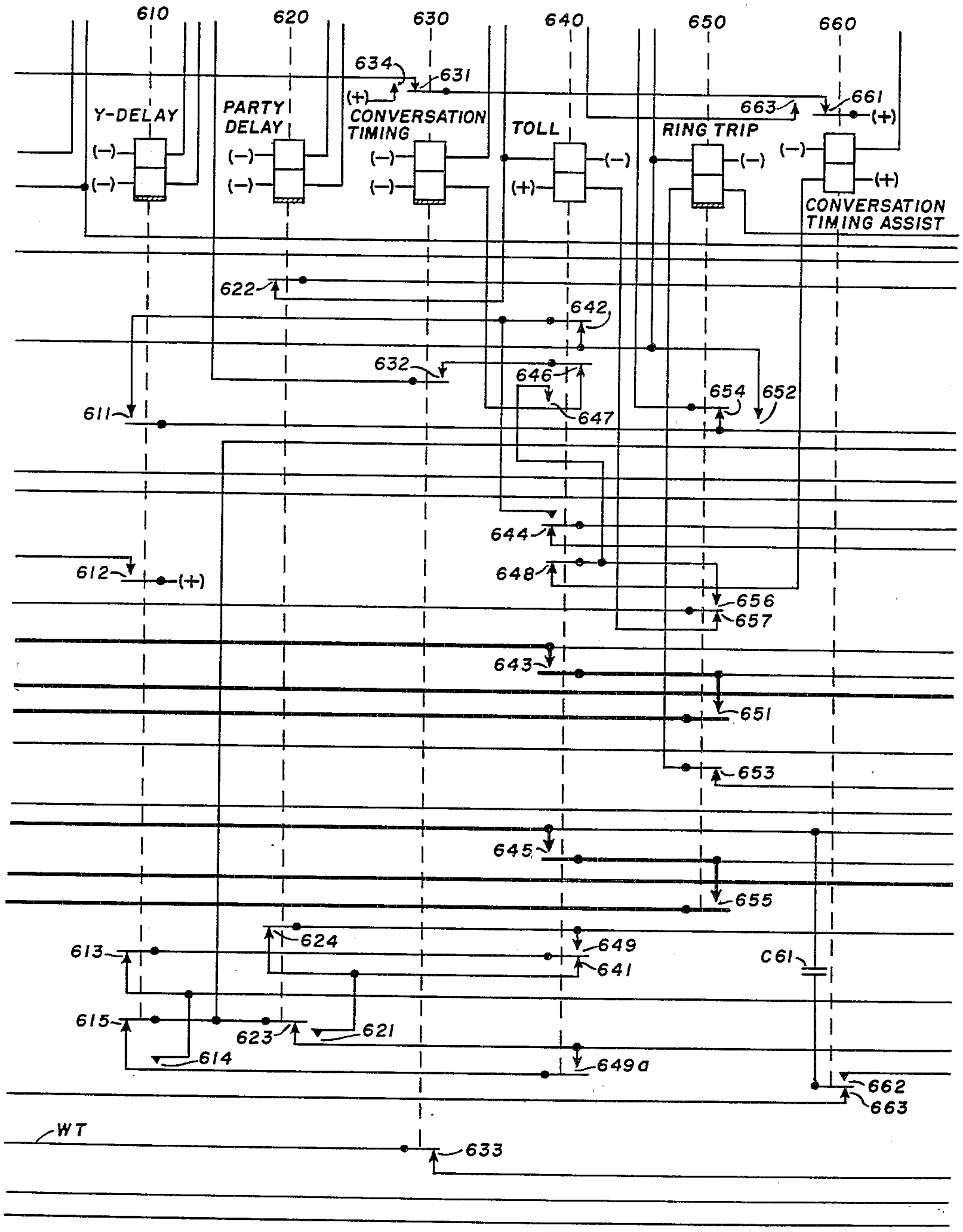

Switching relay 720 locks to master ground through its upper winding and operated contacts 423; closes contacts 723 and 724 leading to the tip and ring brushes T and R, respectively, in order to prepare the talking circuit; opens the release alarm lead RA at contacts 424; and closes the circuit to X-delay relay 540 from ground at contacts 425 through normal contacts 342, 323 and 244, operated off-normal contacts Y–3, normal contacts 351, and the lower winding of relay 540 to battery (if pick-up or pulsing ground is desired, contacts 425 can be connected to a suitable source of ground pulses instead of directly to ground as indicated in Fig. 4); effects the application of ground to the upper winding of answer bridge relay 510 at operated contacts 426, the other side of the upper winding of relay 510 being connected to the tip brush T through normal contacts 541 and operated contacts 723 while the lower winding of answer bridge 510 is connected between battery and the ring brush R through the lower winding of relay 510, normal contacts 542 and operated contacts 724; connects busy test relay 710 to the middle bank of minor switch M by way of the upper winding of relay 710, operated contacts 725 and normal contacts 644, the other side of the middle section of the minor switch being returned through normal contacts 351, Y off-normal springs Y–3, normal contacts 244, 323 and 342 and operated contacts 425 to ground; grounds the front sleeve lead at operated contacts 726; connects the forward HS brush to the bottom bank of minor switch M through operated contacts 727 for intercept purpose; and prepares a circuit for applying ring-back tone to the calling line at contacts 729.

X-delay relay 540 reoperates over the above-described circuit and responsive thereto either the tip lead T or the ring lead R is grounded depending upon whether busy test relay 710 is operated. At this point it is noted that, in the illustrated system, the busy test relay 710 operates at this time when ringing is carried out on the tip lead but remains unoperated if ringing is applied to the ring lead. Referring to Fig. 4 it will be noted that the ring generators G*en* 1 to G*en* 5, inclusive, are connected in a particular order to the contacts of the upper section of minor switch M. Ringing source G*en* 1, for example, is connected to the first and sixth contacts, G*en* 2 is connected to the second and seventh contacts, etc. Ringing of the called line is accomplished over the tip lead whenever switch M stands on an odd numbered contact, and over the ring lead whenever switch M stands on an even numbered contact. In the latter case, busy test relay 710 is operated over a circuit extending from ground at operated contacts 425 through normal contacts 342, 323 and 244, operated off-normal contacts Y–3, normal contacts 351, mid section of minor switch M, one of the even numbered contacts of the mid section of minor switch M, normal contacts 644, operated contacts 725 and the upper winding of busy test relay 710. Thus, it will be noted that the busy test relay operates at this particular time only when the minor switch has stepped to one of the even numbered contacts, but remains unoperated when the minor switch advances to an odd numbered contact in which case the energizing circuit for busy test relay 710 remains incomplete. The operation of busy test relay 710 at this time connects ground to the ring brush R through operated contacts 715, 544 and 724. If the minor switch M stands on an odd contact so that busy test relay 710 is unoperated, ground is connected to tip brush T by way of normal contacts 716, operated contacts 543 and 723.

The above-mentioned reoperation of X-delay relay 540 also connects ring-back tone from lead RBT (Fig. 7) to ring lead R through operated contacts 729 and 545, normal contacts 663 and capacitor C61, and extends the generator lead corresponding to the dialed digit from the top section of minor switch M to ring lead R through the lower winding of ring tip relay 650, normal contacts 653, normal contacts 717 (assuming that busy test relay 710 is unoperated), operated contacts 544 and 724. If the minor switch M is positioned on an even numbered contact, in which case busy test relay 710 is operated, the selecter generator lead is connected to tip brush T through the top section of minor switch M, lower winding of ring trip relay 650, normal contacts 653 and operated contacts 718, 543 and 723.

F. *Answer*

Ring trip relay 650 is provided with normally open contacts 353 of the preliminary type, i. e. contacts 353 operate in response to the partial energization of relay 650 as indicated by "X." In response to the answering of the call by the called party, ring trip relay 650 is partially energized to close contacts 353 over the previously described ringing circuit through the lower winding of relay 650. In response to the closure of preliminary contacts 353, Y-delay relay 610 is reoperated from ground by way of operated contacts 231, normal contacts 513, operated contacts MZ–2 of minor switch M, normal contacts 654 (which are still closed), preliminary contacts 353 and upper winding of Y-delay relay 610.

The operation of relay 610 at this time closes a circuit for energizing the upper winding of ring trip relay 650 from master ground through normal contacts 513, operated contacts MZ–2, operated contacts 611, normal contacts 642, lower winding of relay 650, top section of minor switch M to ground by way of the ringing signal generator associated with the particular contact on which the upper brush of minor switch M rests.

Figure 2:
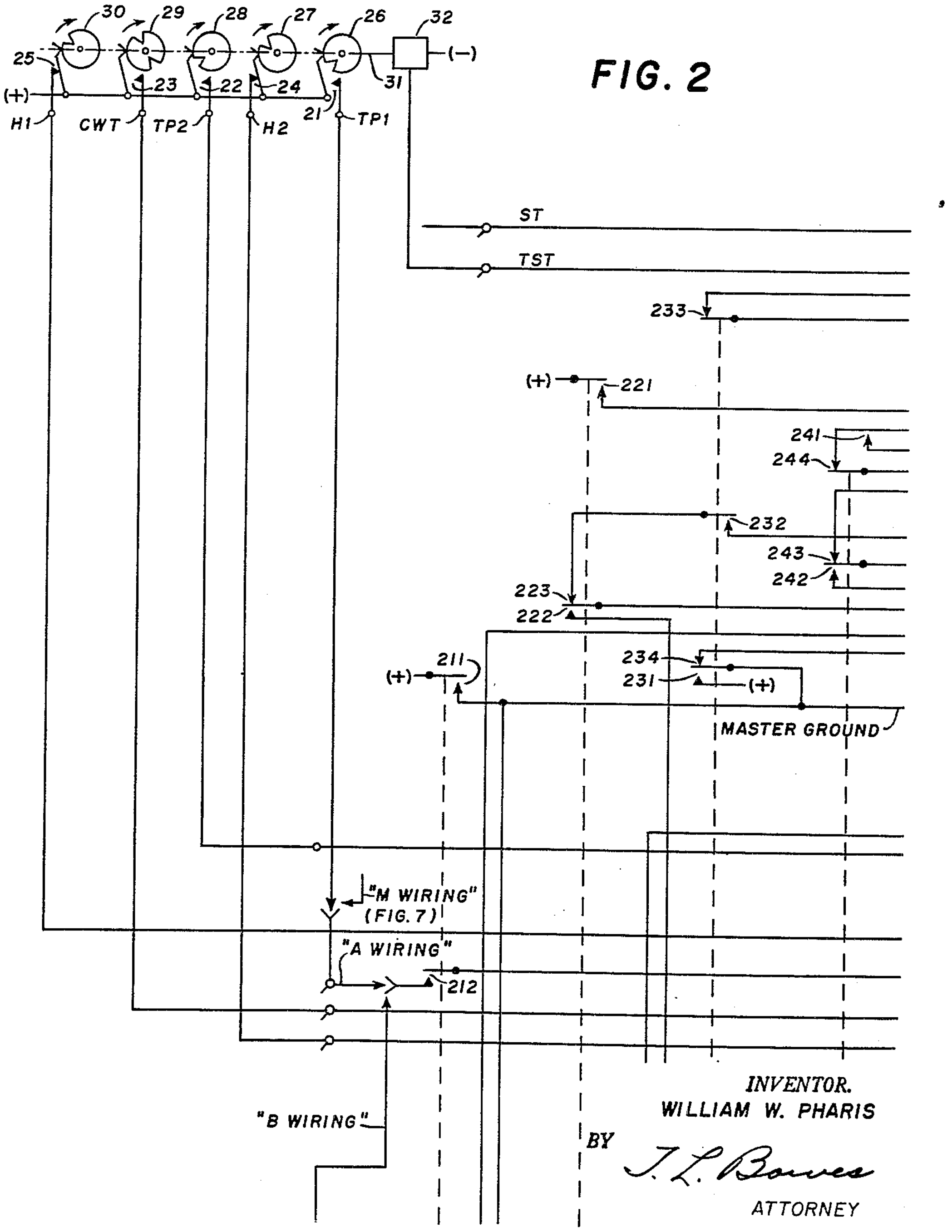
Figure 3:
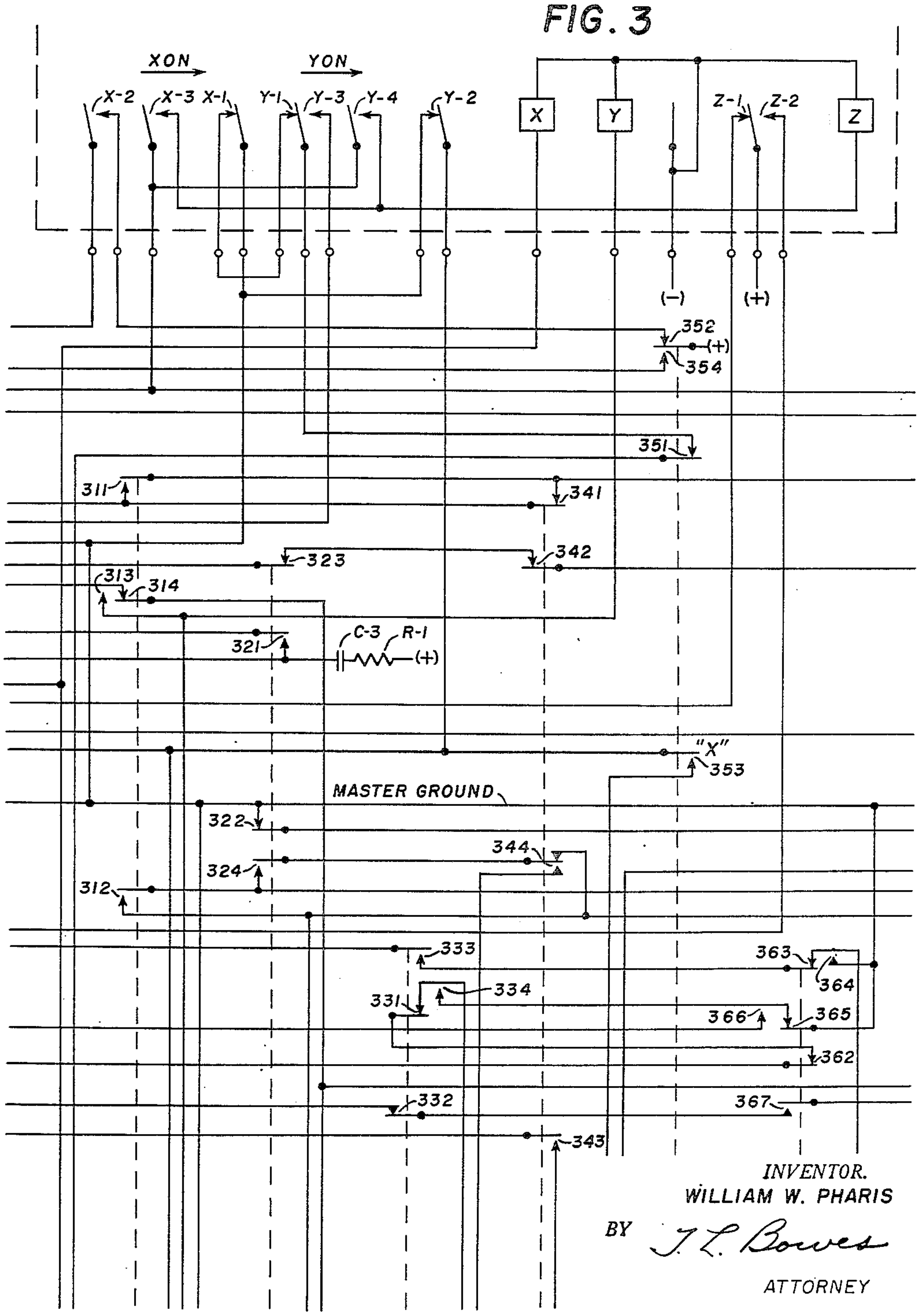

In response to the completion of the foregoing circuit, ring trip relay 650 operates fully and locks to master ground through its upper winding, operated contacts 652, minor switch contacts MZ–2 and normal contacts 513 to master ground at operated contacts 231; trips the ringing circuit at contacts 653; unlocks X-delay relay 540 at operated contacts 351; closes points in the talking circuit through tip and ring leads T and R, respectively, at contacts 651 and 655; opens the holding circuit for Y-delay relay 610 at normal contacts 654; and grounds the timing start lead TST at operated contacts 354 to start interrupter motor 32 (Fig. 2).

In response to the release of X-delay relay 540, additional points are closed in the talking circuit over leads T and R at normal contacts 541 and 542, respectively. The release of X-delay relay 540 also interrupts ring-back tone at now open contacts 545, and connects answer bridge relay 510 to the tip and ring leads at contacts 541 and 542, respectively.

The answer bridge relay 510 operates over the closed loop extending from tip brush T through operated contacts 723, normal contacts 541, upper winding of relay 510 to ground at operated contacts 426, and from ring brush R through operated contacts 724, normal contacts 542 and lower winding of relay 510 to battery, and connects reverse battery to the calling line for supervision purposes at operated contacts 515 and 516; closes an alternate master ground at operated contacts 211; transfers a holding circuit for the upper winding of relay 650 to master ground at operated contacts 514; and completes a circuit for energizing toll relay 640 through its upper winding, normal contacts 622, operated contacts 728, operated contacts 517, normal contacts 631 and 661 to ground.

The operation of toll relay 640 closes tip and ring leads T and R, respectively, through operated contacts 643 and 645, respectively. A talking path is now complete and conversation may proceed.

G. *Release*

In the arrangement shown in Figs. 2 to 7, inclusive, provision is made for last party release. The sequence of operations is first traced under the condition that the calling party disconnects first. As soon as the calling party hangs up or restores his receiver, the calling bridge relay 520 is deenergized. As soon as this relay restores, the energizing circuit for delay relay 530 is opened at contacts 222. After a time delay relay 530 restores.

The restoration of relay 530 prepares a path to the release alarm lead RA at normal contacts 233; releases one connection for master ground at contacts 231; removes ground from the back sleeve lead at contacts 532; and closes a circuit for again operating Y-delay relay 610 from ground by way of operated contacts 211, normal contacts 234 and the upper winding of relay 610.

In response to the present operation of Y-delay relay 610, the back sleeve lead S is grounded at operated contacts 612 and lamp MON is illuminated by way of operated contacts 221 and 311.

At this point it is noted that ring trip relay 650 remains operated through operated contacts 211 and 514 through the upper winding of trip relay 650 and switching relay 720 remains operated through its upper winding and operated contacts 423 and 211.

When the called party thereafter disconnects, the loop to answer bridge relay 510 is opened. The consequent restoration of relay 510 removes master ground at contacts 211, thereby deenergizing relays 610 and 720; opens the holding circuit for relay 650 at the now open contacts 514; reverses battery on the tip and ring leads by the opening of contacts 515 and 516 and the closure of contacts 511 and 512, respectively; and opens the circuit for the upper winding of toll relay 640 at contacts 517. Consequently, relays 610, 640, 650 and 720 restore.

The restoration of switching relay 720 removes ground from the forward sleeve lead S at contacts 726; opens the tip and ring leads T and R, respectively, at contacts 723 and 724, respectively; closes a circuit to release alarm lead RA from battery at the release magnet MZ of minor switch M through contacts MZ–3, normal contacts 233 and 424; deenergizes relay 710 (if operated) at contacts 725 and at contacts 425 removes ground from the lower winding of relay 540. Relays 540 and 710 restore.

The release magnet Z of the connector switch CS*w* is energized from resistance ground on the release alarm lead RA by way of normal contacts 424 and 233, off-normal contacts X–3 and Y–4 in parallel, and Z magnet to battery. The energization of magnet Z operates the release contacts Z–2 and opens release contacts Z–1. The operation of release contacts Z–2 causes the application of ground to the back sleeve lead through the busy key in order to busy the connector circuit during the release period. When switch CS*w* restores to normal, the off-normal springs are restored to open the energizing circuit for magnet Z. The Z magnet restores to remove ground from the back sleeve lead and the circuit is now available for other calls.

The sequence of operations when the called party disconnects first is next described. In response to the opening of the called loop, answer bridge relay 510 releases and restores in order to reverse battery on the tip and ring leads, transfer the holding circuit for ring trip relay 650, open the master ground connection at contacts 211, and deenergizes relay 640 as previously described in connection with first release by the calling party.

When the calling party thereafter restores his receiver, calling bridge relay 520 prepares the previously described circuit to resistance ground on lead RA, opens the master ground circuit, and removes ground from the back sleeve lead. Thereafter, as described above in connection with first release at the calling end, the remaining relays release and the step-by-step switch returns to normal and the circuit is made available for other calls.

II. CONVERSATION TIMING

Means is provided in the connector circuit described herein for furnishing conversation timing on all levels or specified levels as desired. Means is also provided for canceling conversation timing on selected calls such as toll calls, for example. In this connection there is provided a source of timing pulses and holding ground which may be conventional. Such a source is commonly a suitable timed pulse generating means such as a multi-contact interrupter. In the schematic arrangement shown in Fig. 2 there are represented a plurality of switches 21 to 25 arranged to be opened or closed, as the case may be, at suitable time intervals. For example, the various switches can be operated by a set of cams 26 to 30, respectively, mounted in any suitable manner on a rotating shaft indicated by the dash dot line 31 connected to a suitable source of motivation such as a motor 32. The cams and switches may be arranged such that switches 21, 22 and 23 are normally open but are moved to closed positions at certain predetermined times, and switches 24 and 25 are normally closed but are moved to open positions at predetermined times. Fig. 8 represents a time chart showing the periods of time when ground is applied through switches 21 to 25, inclusive, to the timing pulse leads TP–1, TP–2, holding ground leads H–1 and H–2, and warning tone lead CWT. Assuming that the interrupter motor 32 is energized over timing start lead TST and cams 26 to 30 are sequentially operating switches 21 to 25, respectively, a pulse of ground potential is applied to lead TP–1 through switch 21 when that switch is closed and similarly ground pulses are applied to leads TP–2 and CWT at the times indicated by the horizontal dashes in Fig. 8. Holding ground is applied to holding ground leads H–1 and H–2 through normally closed switches 24 and 25 except during the short intervals indicated by the breaks in the horizontal lines opposite the designations H–1 and H–2 in Fig. 8.

A. *Conversation timing on all levels*

The first pulse of ground on lead TP–1 appearing at time *t1* (see Fig. 8) energizes conversation timing relay 630 through its upper winding, normal contacts 331, normal contacts 362 and operated contacts 212, A wiring, and pulse lead TP–1.

The operation of conversation timing relay 630 establishes a locking circuit to master ground through the lower winding of relay 630, normal contacts 646 and operated contacts 632; opens the CWT lead at contacts 332; opens the warning tone lead WT (Fig. 5) at contacts 633; connects the TP–2 lead to the upper winding of relay 660 through operated contacts 333 and normal contacts 363; and transfers the energizing circuit for relay 630 from normal contacts 331 to transfer contacts 334 and normal contacts 365 to master ground.

After a predetermined time a positive pulse appears on lead TP–2 at time *t2* to energize conversation timing assist relay 660 through operated contacts 333, normal contacts 363 and the upper winding of relay 660.

In response to the operation of relay 660, the energizing circuit of relay 660 is transferred to master ground at contacts 364; the holding circuit for relay 630 is transferred from lead TP–1 through normal contacts 331 and 362 to holding ground on lead H–1 through operated contacts 334 and 366; the TP–1 lead is opened at contacts 362; a circuit is prepared through the lower winding of busy test 710 by way of operated contacts 367 and normal contacts 332 (now open) to the CWT lead; a circuit is prepared for connecting warning tone from warning tone lead WT through normal contacts 633 (now open), contacts 719 (still open), operated contacts 662 and capacitor C–61 to the ring lead R; a holding circuit is prepared for relay 640 by way of holding ground on lead H–2, contacts 343 (still open), operated contacts 663, normal contacts 631 (now open), operated contacts 517 and 728, normal contacts 622 and upper winding of 640 to battery.

Upon the removal of ground from lead H–1 at time *t3*, conversation timing relay 630 is deenergized and restores.

The restoration of relay 630 connects lead CWT through normal contacts 332 and operated contacts 367 to the lower winding of busy test relay 710; opens the holding ground lead H–1 at contacts 334; closes a point in the warning tone lead WT at normal contacts 633; and completes the previously prepared holding circuit for toll relay 640 from ground on hold lead H–2 by way of operated contacts 343, 663, normal contacts 631, operated contacts 517 and 728, and normal contacts 622 to the upper winding of relay 640.

After a predetermined interval of time, at time *t4*, ground appears on lead CWT to operate busy test relay 710. In response to the energization of relay 710, ground is connected to lamp MON by way of contacts 412; and warning tone is connected to the talking circuit by way of lead WT, normal contacts 633, operated contacts 719 and 662 and condenser C61, whereupon the parties are given a warning tone.

When the positive pulse on lead CWT is removed, busy test relay 710 is deenergized and restores to remove ground from the lamp MON and warning tone from the line.

After another predetermined time (at time *t5*), ground reappears on lead CWT, thereby effecting the reclosure of busy test relay 710 to reconnect warning tone to the line for the duration of the CWT pulse.

When, thereafter, at time *t6*, gound is momentarily removed from hold lead H–2, the upper winding of relay 640 is deenergized. Upon the restoration of relay 640, the talking circuit is interrupted at contacts 643 and 645.

B. *Conversation timing on specified levels*

Figure 7:
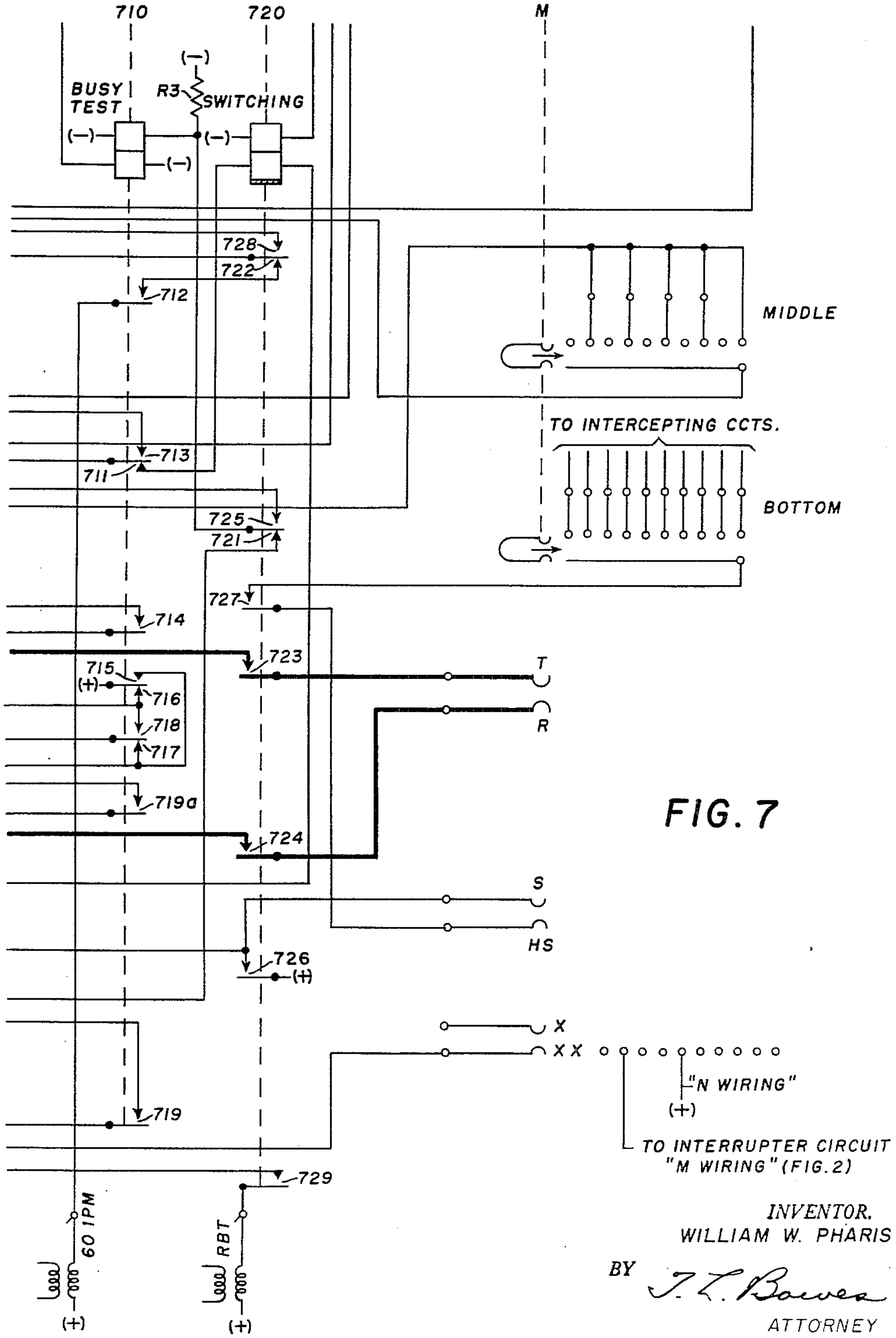

In accordance with one feature of my invention, means is provided for furnishing conversation timing only on specified levels of connector switch CS*w*. Referring to Fig. 2, if conversation timing on all levels is desired, the wiring connection indicated by the legend "A wiring" is used, as previously described, and the wiring identified by the legend "B wiring" is omitted. If conversation timing only on specified levels is required, the "B wiring" is used and the "A wiring" is omitted. When the "B wiring" is used, the conversion timing circuit is connected through the XX brush and XX bank of contacts of the desired level to ground (Fig. 7).

The XX brush constitutes an auxiliary level marking brush, which is positioned to engage auxiliary contacts according to the primary movement of the switch, i. e., the XX brush moves in the secondary direction into an auxiliary set or bank of contacts as the main brushes move in the primary direction. The XX brush arrangement is conventional with the well-known XY switch. The ground connection may be direct, as indicated by the "N wiring" in Fig. 7, or to the TP–1 ground as indicated by the "M wiring" in Fig. 7. The pulse ground connection by way of conductor TP–1 provides a longer conversation timing period inasmuch as ground is applied only for a short interval at a predetermined time and the conversation timing period may be extended by the period of time between successive ground pulses on lead TP–1.

Assuming the provision of "B wiring" and "N wiring," ground is applied to the conversation timing relay 630 in response to the operation of answer bridge relay 510 over a circuit extending from the XX bank contact to which ground is connected, the XX brush, "B wiring," operated contacts 212, normal contacts 362 and 331, and the upper winding of conversation timing relay 630 to battery.

In response to the operation of conversation timing relay 630, a circuit is completed to lock relay 630 to master ground by way of operated transfer contacts 334 and normal contacts 365; open lead CWT at contacts 332; open the conversation warning tone lead WT at contact 633; connect lead TP–2 to the upper winding of conversation timing assist relay 660 through operated contacts 333 and normal contacts 363; and at operated contacts 634 provides means for maintaining ground for the upper winding of relay 640 after the operation of relay 660 and the consequent opening of contacts 661. After a predetermined time (time *t2*), a ground pulse appears on the TP–2 lead and relay 660 is energized.

In response to the operation of relay 660, the energizing circuit for relay 660 is transferred from normal contacts 363 to operated transfer contacts 364, thereby establishing a locking circuit for relay 660; the holding circuit for conversation timing relay 630 is transferred from normal contacts 365 to operated transfer contacts 366 and the hold lead H–1; a circuit is prepared to the lower winding of busy test relay 710 at operated contacts 367; a circuit is prepared for connecting warning tone from lead WT at operated contacts 662 to ring lead R; and a holding circuit for relay 640 is prepared from ground on hold lead H–2 by way of contacts 343 (unoperated at this time), operated contacts 663, normal contacts 631 (now open), operated contacts 517 and 728, normal contacts 622 and upper winding of relay 640.

In response to the later removal of ground from holding lead H–1 at time *t3*, relay 630 is deenergized and restores. In response to the release or restoration of relay 630, lead CWT is connected through normal contacts 332 and operated contacts 367 to the lower winding of busy test relay 710; the holding path by way of hold lead H–1 is opened at now open contacts 334; an additional point in the warning tone lead WT is closed at normal contacts 633; and another point is completed in the previously prepared holding circuit for relay 640 from ground on hold lead H–2 through operated contacts 343 and 663, normal contacts 631, operated contacts 517 and 728, normal contacts 622 and upper winding of relay 640.

The appearance of a ground pulse upon lead CWT after a predetermined time interval (time *t4*) effects the operation of busy test relay 710. In response to the operation of busy test relay 710 at this time, ground is connected to lamp MON at contacts 412; the warning tone lead WT is closed at operated contacts 719, whereupon warning tone is applied to the ring lead R from lead WT through normal contacts 633, operated contacts 719, operated contacts 662, and capacitor C–61. When the ground pulse on lead CWT is removed, busy test relay 710 restores and the warning tone is removed because of the opening of contacts 719.

After another predetermined interval of time (at time *t5*) a ground pulse reappears on the CWT lead which effects the reoperation of relay 710 as previously described. The reoperation of relay 710 again connects ground to lamp MON and applies warning tone to the talking circuit. At the end of the second ground pulse on lead CWT, the energizing circuit for relay 710 is again broken to cut out lamp MON and remove the warning tone from the talking circuit.

Shortly thereafter, at time *t6*, holding ground is momentarily removed from lead H–2, thereby opening the circuit to relay 640, whereupon relay 640 restores and opens the talking circuit to prevent further conversation. Thus, for purposes of this invention, relay 640 may be considered to be a "conversation terminating relay."

If it be assumed that the "M wiring" of Fig. 7 is used instead of the "N wiring," ground is not provided to operate conversation timing relay 630 until the appearance of a ground pulse on lead TP–1, that ground pulse being applied to relay 630 by way of lead TP–1, "M wiring," XX bank contact, XX brush, "B wiring," operated contacts 212, normal contacts 362 and 331, and upper winding of relay 630. The further operation of the conversation timing circuit is identical to that described above in connection with the "N wiring." Thus, instead of operating relay 630 immediately upon answering, the timing cycle is not started until the first appearance of the ground pulse on lead TP–1. If the interrupter cycle is two minutes, this timing cycle will begin between the time of answering and two minutes after answering by the called party, depending upon the position of cam 26 at the time of energization of relay 510.

III. TOLL ACCESS

It is next assumed that a calling condition has been set up in the banks of finder 3 in response to a call from toll line 10 which is connected to a toll trunk terminating in finder 3 by any suitable means, as trunk 9 for example. The operator who completes the toll connection is provided with means for applying resistance battery or resistance ground to control lead HS. This means is represented schematically by a relay 110 having normal contacts 111 for normally connecting resistance ground to lead HS and front contacts 112 for connecting resistance battery to lead HS whenever relay 110 is operated. Any suitable means may be employed for effecting the operation of relay 110. Inasmuch as the particular operating circuit for relay 110 forms no part of my present invention, no connection has been shown. Of course it will be understood that, if desired, contacts 111 and 112 may be replaced by suitable keys for manual actuation by the toll operator.

The toll call is extended to connector 7 in the same manner as described in connection with a local call.

However, in connection with a toll call, resistance battery is forwarded over lead HS from the distant office to operated toll relay 640 over a circuit extending from lead HS through normal contacts 657 and the lower winding of toll relay 640 to ground.

In response to the operation of toll relay 640, there is prepared a circuit for switching relay 720 at operated contacts 649 and the lower winding of relay 720; a circuit is prepared for operating busy test relay 710 by way of operated contacts **649*a* and normal contacts 721 to the upper winding of relay 710; and a locking circuit to master ground is completed through the upper winding of relay 640, operated contacts 344, operated contacts 324, minor switch contacts MZ–1, and normal contacts 513**.

The operation of the connector circuit during dialing is the same as described in connection with a local call except that after the second digit, during the release time of Y–delay relay 610, busy test relay 710 is connected to the forward sleeve lead S by way of sleeve brush S, operated contacts 614, operated contacts **649*a*, normal contacts 721, and the upper winding of relay 710**.

If the called line is busy, busy test relay 710 operates and prepares a circuit for connecting an impulsing ground by way of lead 60IPM through operated contacts 712, normal contacts 722 and 622, to the upper winding of ring trip relay 650 at operated contacts 413; removes ground from switching relay 720 at normal contacts 711; and deenergizes relay 620 upon the opening of normal contacts 411.

In response to the restoration of relay 620, the holding circuit for toll relay 640 is broken at contacts 324; a circuit is closed to ring trip relay 650 from master ground at normal contacts 322 by way of normal contacts 421, operated contacts 413, and the upper winding of relay 650 to battery; and impulsing ground is connected to toll relay 640 from lead 60IPM through operated contacts 712, normal contacts 722, and normal contacts 622.

In response to the operation of ring trip relay 650 in response to the restoration of relay 620, the HS lead is extended to operated contacts 647 by way of operated contacts 656.

Relay 640 follows the pulses on lead 60IPM. The pulsing of relay 640 alternately connects resistance ground or resistance battery to the back HS lead in order to provide supervision to the toll operator. The circuit to resistance ground extends from lead HS through operated contacts 656, normal contacts 648, and the lower winding of relay 660 to battery, the lower winding of relay 660 serving as a resistor. During the periods when relay 640 is operated, resistance battery is connected to the HS lead through operated contacts 656, operated contacts 647, and a resistor comprising, in the illustrated form of my invention, the lower winding of relay 630 to battery.

If the called line is idle, a circuit is completed for operating switching relay 720 following the restoration of Y-delay relay 610 after the end of the second digit, the circuit extending from battery on the sleeve lead by way of normal contacts 613, 641, and 624, lower winding of relay 720, normal contact 711, and operated contacts 531 to battery. In response to the operation of switching relay 720, ground is connected to the front sleeve S at contacts 726 and the system thereafter functions as it did on local calls.

The toll operator may withhold ringing by delaying the dialing of the third digit until ringing of the called party is desired. Should a party on the called line attempt to initiate a call during this period, the answer bridge relay 510 operates and closes a circuit to the upper winding of ring trip relay 650 and also reverses battery on the tip and ring leads. The ring trip relay 650 operates and closes the tip and ring leads through the transmission condensers C–51 and C–52 in order to connect the toll operator with the party trying to initiate the call.

IV. CANCELLATION OF CONVERSATION TIMING

In accordance with another feature of my invention, means is provided for canceling conversation timing on either toll calls or local calls.

In order to cancel conversation timing on toll calls, means is provided to apply resistance ground to the HS lead leading to the connector. For example, relay 110 is permitted to remain unoperated or a suitable key is operated to apply resistance ground to the HS lead. With this arrangement, when the called party answers, ring trip relay 650 operates its preliminary contacts 353 over the called loop as previously described in connection with a local call. The closure of preliminary contacts 353 in response to the partial operation of ring trip relay 650 effects the operation of relay 610 from master ground at operated contacts 231 by way of normal contacts 513, minor switch contacts MZ–2, normal contacts 654 (which remain closed during the partial energization of relay 650), preliminary operated contacts 353 and upper winding of relay 610 to battery.

The operation of relay 610 closes a circuit to the top winding of ring trip relay 650 through normal contacts 642, operated contacts 611, minor switch contacts MZ–2, and normal contacts 513 to master ground, thereby effecting the full operation of ring trip relay 650.

Relay 650 locks to master ground through its upper winding and operated contacts 652, minor switch contacts MZ–2, and normal contacts 513; extends the tip and ring leads from the talking condensers at operated contacts 651 and 655; and opens the energizing circuit to Y-delay relay 610 at contacts 654.

In response to the release of relay 540 after a predetermined time delay, ring back tone is removed by the opening of contacts 545 and answer bridge relay 510 is connected to the tip and ring conductors at normal contacts 541 and 542, whereupon the answer bridge relay operates over the closed called loop.

In response to the operation of relay 510, reverse battery is connected to the calling line for supervision; an alternate connection to master ground is completed at operated contacts 211; a holding circuit for the lower winding of ring trip relay 650 is established at operated contacts 514; a circuit is completed for operating relay 640 through its upper winding, normal contacts 622, operated contacts 728, operated contacts 517, normal contacts 631, and normal contacts 661 to ground. The operation of relay 640 closes the talking circuit at operated contacts 643 and 645 to complete the conversation circuit.

In response to the operation of ring trip relay 650 and the reoperation of toll relay 640, a circuit is completed for operating conversation timing relay 630 through its lower winding, operated contacts 647 and 656 and control lead HS back to the toll operator's position or trunk 9 to resistance ground. The conversation timing relay 630 operates to open lead TP–1 at contacts 331 and locks to resistance ground on the HS lead so that the conversation timing relay 630 cannot be released and thereby timing of the call is prevented.

In order to cancel conversation timing on local calls ground or resistance ground is connected to the HS lead in line circuit 2 corresponding to the line with respect to which conversation timing is desired to be canceled or is connected to the appropriate terminals in the banks of finder 3. The operation of the conversation timing canceling means is the same as described in connection with toll calls.

While I have shown and described a particular embodiment of my invention, it will be obvious to those skilled in the art that changes and modifications may be made without departing from my invention in its broader aspects. It will also be obvious to those skilled in the art that the invention, insofar as the conversation timing by levels feature is concerned, may be employed in other circuits as well as in a connector circuit. For example, this feature may be used in a selector repeater, terminating trunk lines from a distant office, to time calls extended to either trunk or connector groups terminating in specified levels in its banks. I, therefore, aim in the appended claims to cover all such changes and modifications as fall within the true spirit and scope of my invention.

What I claim is:

1. In a telephone system a plurality of lines, means for establishing a talking connection between calling and called lines of said plurality of lines, said establishing means comprising a connector switch having a primary movement for selecting a desired level of contacts and a secondary movement for selecting a desired contact in the selected level, a set of auxiliary contacts, an auxiliary brush positioned to engage said auxiliary contacts according to the primary movement of said switch, conversation timing means, and means connected to one or more of said auxiliary contacts for causing said conversation timing means to time the conversation on lines connected to the switch levels corresponding to said one or more auxiliary contacts.

2. In a telephone system a plurality of lines, means for establishing a talking connection between calling and called lines of said plurality of lines, said establishing means comprising a connector switch having a primary movement for selecting a desired level of contacts and a secondary movement for selecting a desired contact in the selected level, a set of auxiliary contacts, an auxiliary brush positioned to engage said auxiliary contacts according to the primary movement of said switch, conversation timing means, means connected to one or more of said auxiliary contacts for causing said conversation timing means to time the conversation on lines connected to the switch levels corresponding to said one or more auxiliary contacts, and means for rendering ineffective said conversation timing means on calls from certain of said lines.

3. In a telephone system a plurality of lines, means for establishing a talking connection between calling and called lines of said plurality of lines, said establishing means comprising a connector switch having a primary movement for selecting a desired level of contacts and a secondary movement for selecting a desired contact in the selected level, a set of auxiliary contacts, an auxiliary brush positioned to engage said auxiliary contacts according to the primary movement of said switch, and means responsive to the positioning of said auxiliary brush on a certain auxiliary contact for timing the conversation on calls to lines terminating in the switch level corresponding to said certain auxiliary contact.

4. In a telephone system a plurality of lines, means for establishing a talking connection between calling and called lines of said plurality of lines, said establishing means comprising a connector switch having a primary movement for selecting a desired level of contacts and a secondary movement for selecting a desired contact in the selected level, a set of auxiliary contacts, an auxiliary brush positioned to engage said auxiliary contacts according to the primary movement of said switch, means responsive to the positioning of said auxiliary brush on a certain auxiliary contact for timing the conversation on calls to lines terminating in the switch level corresponding to said certain auxiliary contact, and means for rendering ineffective said responsive means on calls from certain of said first group of lines.

5. In a telephone system a plurality of lines, means for establishing a talking connection between calling and called lines of said plurality of lines, said establishing means comprising a connector switch having a primary movement for selecting a desired level of contacts and a secondary movement for selecting a desired contact in the selected level, a set of auxiliary contacts, an auxiliary brush positioned to engage said auxiliary contacts according to the primary movement of said switch, and means responsive to the positioning of said switch in a certain level of said contacts for timing the conversation on calls to lines terminating in said certain level.

6. In a telephone system a plurality of lines, means for establishing a talking connection between calling and called lines of said plurality of lines, said establishing means comprising a connector switch having a primary movement for selecting a desired level of contacts and a secondary movement for selecting a desired contact in the selected level, a set of auxiliary contacts, an auxiliary brush positioned to engage said auxiliary contacts according to the primary movement of said switch, means responsive to the positioning of said switch in a certain level of said contacts for timing the conversation on calls to lines terminating in said certain level, and means for rendering ineffective said responsive means on calls for certain of said lines.

7. In a telephone system a plurality of lines, means for establishing a talking connection between calling and called lines of said plurality of lines, said establishing means comprising a connector switch having a primary movement for selecting a desired level of contacts and a secondary movement for selecting a desired contact in the selected level, a set of auxiliary contacts, an auxiliary brush positioned to engage said auxiliary contacts according to the primary movement of said switch, and means responsive to the positioning of said switch in a certain level of said contacts and utilizing said auxiliary brush and said auxiliary set of contacts for timing the conversation on calls to lines terminating in said certain level.

8. In a telephone system a plurality of lines, means for establishing a talking connection between calling and called lines of said plurality of lines, said establishing means comprising a connector switch having a primary movement for selecting a desired level of contacts and a secondary movement for selecting a desired contact in the selected level, a set of auxiliary contacts, an auxiliary brush positioned to engage said auxiliary contacts according to the primary movement of said switch, means responsive to the positioning of said switch in a certain level of said contacts and utilizing said auxiliary brush and said auxiliary set of contacts for timing the conversation on calls to lines terminating in said certain level, and means for rendering ineffective said responsive means on calls from certain of said lines.

9. In a telephone system, a plurality of lines; means for establishing a connection between calling and called ones of said lines; said establishing means including a switch having banks of contacts disposed in a plurality of levels, a set of main brushes arranged for primary movement to a desired level and secondary movement to engage desired contacts in said desired level corresponding to the called line, an auxiliary set of contacts, an auxiliary brush arranged to engage said auxiliary contacts in accordance with the primary movement of said switch, conversation timing means for timing the conversation period on calls to lines terminating in a predetermined level of said switch comprising said auxiliary brush, and a source of potential connected to the auxiliary contact corresponding to said predetermined level.

10. In a telephone system, a plurality of lines; means for establishing a connection between calling and called ones of said lines; said establishing means including a switch having banks of contacts disposed in a plurality of levels, a set of main brushes arranged for primary movement to a desired level and secondary movement to engage desired contacts in said desired level corresponding to the called line, an auxiliary set of contacts, and an auxiliary brush arranged to engage said auxiliary contacts in accordance with the primary movement of said switch, conversation timing means for timing the conversation period on calls to lines terminating in a predetermined level of said switch comprising a relay, and means including said auxiliary brush and the auxiliary contact corresponding to said predetermined level for utilizing said relay to initiate timing of said connection.

11. In a telephone system, a plurality of lines, means for establishing a connection between calling and called ones of said lines including an answer bridge relay, a conversation timing relay, a conversation terminating relay, a conversation timing assist relay, a source of timing pulses, a source of warning tone, means responsive to the answering of the call extended between said calling and called lines for operating said answer bridge relay, means responsive to the operation of said answer bridge relay for energizing said conversation terminating relay to complete the talking connection and for energizing said conversation timing relay to initiate the timing of said connection, means responsive to the receipt of a timing pulse thereafter for operating said assist relay, means for thereafter releasing said timing relay, means responsive to the release of said timing relay for applying warning tone to said connection, means for thereafter releasing said conversation terminating relay, and means responsive to the release of said conversation terminating relay for breaking the established connection.

12. In a telephone system, a plurality of lines, means for establishing a connection between calling and called ones of said lines including an answer bridge relay, a conversation timing relay, a conversation terminating relay, a conversation timing assist relay, a source of timing pulses, a source of warning tone, means responsive to the answering of the call extended between said calling and called lines for operating said answer bridge relay, means responsive to the operation of said answer bridge relay for energizing said conversation terminating relay to complete the talking connection and for energizing said conversation timing relay to initiate the timing of said connection, means for applying a first holding potential to said conversation timing relay, means for applying a second holding potential to maintain energized said conversation terminating relay, means responsive to the receipt of a timing pulse thereafter for operating said assist relay, means for thereafter removing the first holding potential for releasing said timing relay, means responsive to the release of said timing relay for applying warning tone to said connection, means for thereafter removing said second holding potential for releasing said conversation terminating relay, and means responsive to the release of said conversation terminating relay for breaking said connection.

13. In a telephone system, a plurality of lines, means for establishing a connection between calling and called ones of said lines including an answer bridge relay, a conversation timing relay, a conversation terminating relay, a conversation timing assist relay, a source of timing pulses, a source of warning tone, means responsive to the answering of the call extended between said calling and called lines for operating said answer bridge relay, means responsive to the operation of said answer bridge relay for energizing said conversation terminating relay to complete thetalking connection and for energizing said conversation timing relay to initiate the timing of said connection, means for applying a first holding potential to said conversation timing relay, means for applying a second holding potential to maintain energized said conversation terminating relay, means responsive to the receipt of a timing pulse thereafter for operating said assist relay, means thereafter removing the first holding potential for releasing said timing relay, means responsive to the release of said timing relay for applying warning tone to said connection a predetermined number of times at predetermined intervals, means for thereafter removing said second holding potential for releasing said conversation terminating relay, and means responsive to the release of said conversation terminating relay for breaking said connection.

14. In a telephone system, a plurality of lines, means for establishing a connection between calling and called ones of said lines including an answer bridge relay, a conversation timing relay, a conversation terminating relay, a conversation timing assist relay, a source of timing pulses, a source of warning tone, means responsive to the answering of the call extended between said calling and called lines for operating said answer bridge relay, means responsive to the operation of said answer bridge relay and including said auxiliary brush and said auxiliary contacts for energizing said conversation terminating relay to complete the talking connection and for energizing said conversation timing relay to initiate the timing of said connection, means for applying a first holding potential to said conversation timing relay, means for applying a second holding potential to maintain energized said conversation terminating relay, means responsive to the receipt of a timing pulse thereafter for operating said assist relay, means for thereafter removing the first holding potential for releasing said timing relay, means responsive to the release of said timing relay for applying warning tone to said connection, means for thereafter removing said second holding potential for releasing said conversation terminating relay, and means responsive to the release of said conversation terminating relay for breaking said connection.

15. In a telephone system a plurality of lines, means for establishing a talking connection between calling and called ones of said plurality of lines, said establishing means comprising a connector switch having a primary movement for selecting a desired level of contacts and a secondary movement for selecting a desired contact in the selected level, a set of auxiliary contacts, an auxiliary brush positioned to engage said auxiliary contacts according to the primary movement of said switch, an answer bridge relay, a conversation timing relay, a conversation terminating relay, a conversation timing assist relay, a source of timing pulses, a source of warning tone, means responsive to the answering of the call extended between said calling and called lines for operating said answer bridge relay, means responsive to the operation of said answer bridge relay and including said auxiliary brush and said auxiliary contacts for energizing said conversation terminating relay to complete the talking connection and for energizing said conversation timing relay to initiate the timing of said connection, means for applying a first holding potential to said conversation timing relay, means for applying a second holding potential to maintain energized said conversation terminating relay, means responsive to the receipt of a timing pulse thereafter for operating said assist relay, means for thereafter removing the first holding potential for releasing said timing relay, means responsive to the release of said timing relay for applying warning tone to said connection, means for thereafter removing said second holding potential for releasing said conversation terminating relay, and means responsive to the release of said conversation terminating relay for breaking said connection.

16. In a telephone system, two groups of calling lines, a called line, means for establishing connections between one of said calling lines and said called line including an answer bridge relay, a conversation timing relay, a conversation terminating relay, a conversation timing assist relay, a source of timing pulses, a source of warning tone, means responsive to the answering of a call between said calling line and said one called line for operating said answer bridge relay, means for timing calls from lines in one of said groups of calling lines comprising means responsive to the operation of said answer bridge relay for energizing said terminating relay to complete a talking connection and for energizing said timing relay to initiate timing of said connection, means responsive to the receipt of a timing pulse thereafter for operating said assist relay, means for thereafter releasing said timing relay, means responsive to the release of said timing relay for applying warning tone to said connection, means for thereafter releasing said terminating relay, means responsive to the release of said terminating relay for breaking said connection, and means responsive to calls from lines in the other group of calling lines for maintaining said timing relay operated and for rendering ineffective the application of warning tone and the release of said terminating relay, thereby preventing conversation timing with respect to calls from lines in said other group.

17. In a telephone system, a plurality of lines; means for establishing a connection between calling and called ones of said lines; said establishing means including a switch having banks of contacts disposed in a plurality of levels, a set of main brushes arranged for primary movement to select a desired level and a secondary movement to engage contacts in said desired level, an auxiliary set of contacts, and an auxiliary brush arranged to engage said auxiliary contacts in accordance with the primary movement of said switch, conversation timing means, and means connected to one or more of said auxiliary contacts for causing said conversation timing means to time the conversation period on calls completed through contacts in a predetermined level of said switch.

18. In a telephone system, a plurality of lines; means for establishing a connection between calling and called ones of said lines; said establishing means including a switch having banks of contacts disposed in a plurality of levels, a set of main brushes arranged for primary movement to select a desired level and a secondary movement to engage contacts in said desired level, an auxiliary set of contacts, and an auxiliary brush arranged to engage said auxiliary contacts in accordance with the primary movement of said switch, conversation timing means for timing the conversation period on calls completed through contacts in a predetermined level of said switch comprising a relay, and means including said auxiliary brush and the auxiliary contact corresponding to said predetermined level for utilizing said relay to initiate timing of said connection.

References Cited in the file of this patent

UNITED STATES PATENTS

| | | |
|---|---|---|
| 2,226,731 | Lomax | Dec. 31, 1940 |
| 2,291,496 | Newstedt | July 28, 1942 |
| 2,488,797 | Baker | Nov. 22, 1949 |